Aug. 15, 1950    T. H. JUDGE    2,518,623
ROTOR CONTROL MECHANISM AND GROUND-WHEEL
DRIVE FOR HELICOPTERS
Filed June 7, 1946    2 Sheets-Sheet 1
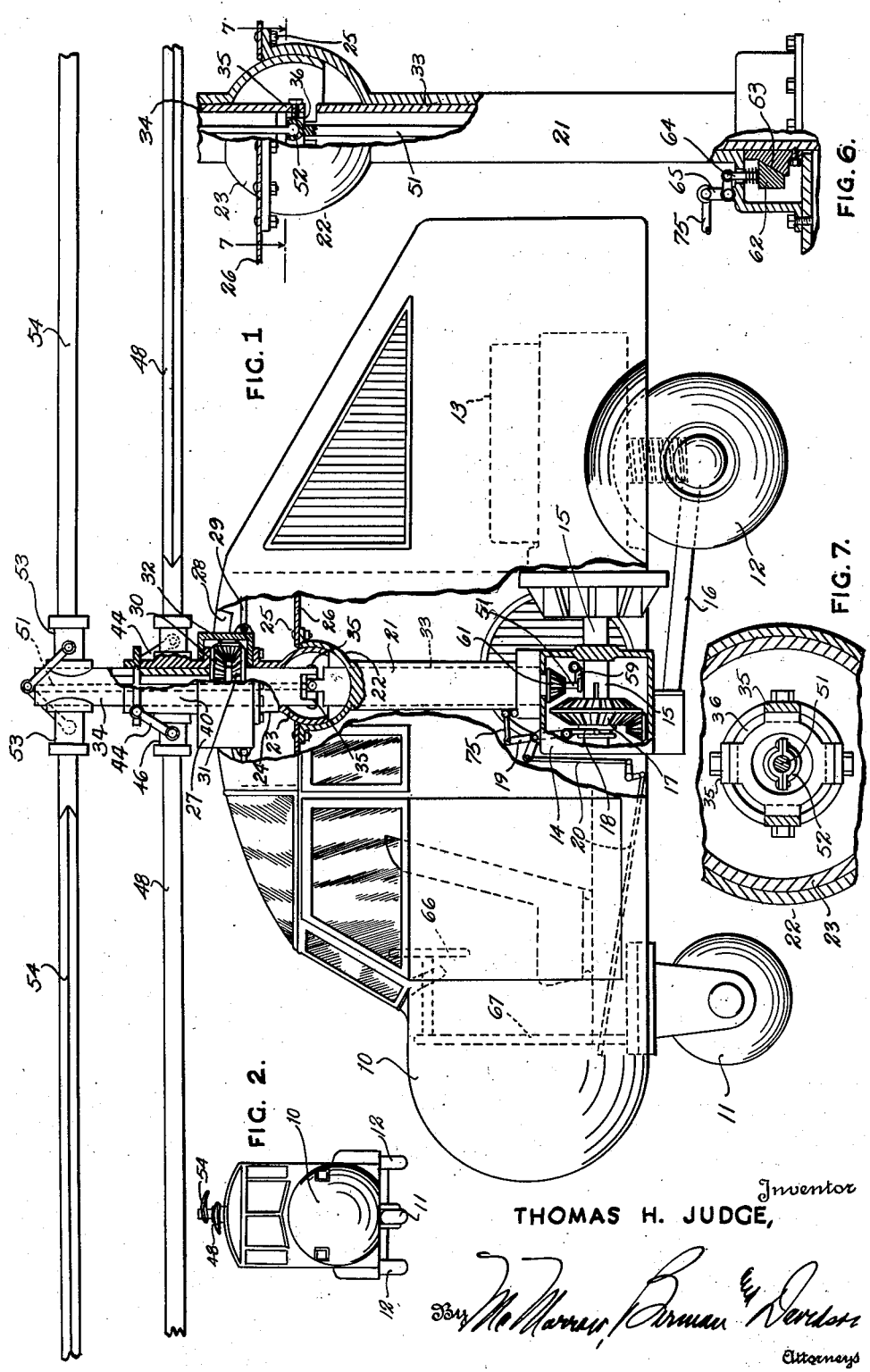
THOMAS H. JUDGE, Inventor Aug. 15, 1950 T. H. JUDGE 2,518,623
ROTOR CONTROL MECHANISM AND GROUND-WHEEL
DRIVE FOR HELICOPTERS
Filed June 7, 1946 2 Sheets-Sheet 2
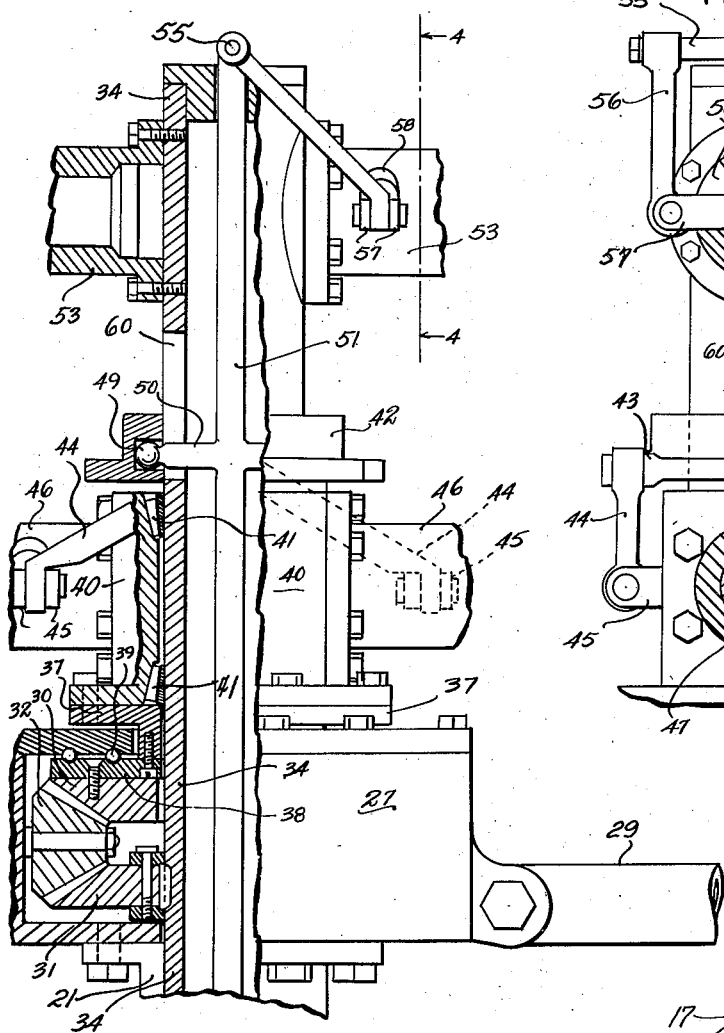
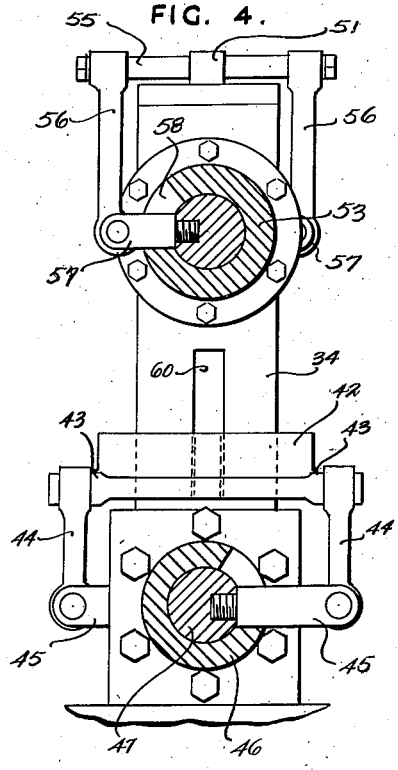
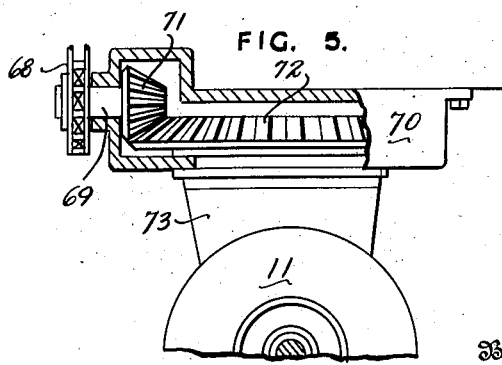
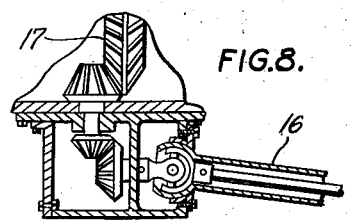
Inventor
THOMAS H. JUDGE, Patented Aug. 15, 1950

2,518,623

UNITED STATES PATENT OFFICE 2,518,623

ROTOR CONTROL MECHANISM AND GROUND-WHEEL DRIVE FOR HELICOPTERS

Thomas H. Judge, West Roxbury, Mass.

Application June 7, 1946, Serial No. 675,062

4 Claims. (Cl. 244—17.17)

1

The present invention relates to helicopters and is more particularly concerned with a combined helicopter and motor vehicle.

The primary object of the invention is to provide a device of the character referred to which will function in the air and on the ground.

Another object of the invention is to provide a device of the character referred to with novel means for powering it for either aerial or ground use.

A further object of the invention is to provide simple means to change the pitch of the helicopter blades and to tilt them.

Still another object of the invention is to provide a device of the character referred to of simpler and more compact construction than prior devices.

With the foregoing and other objects and advantages in view the invention consists of the novel construction and arrangement of parts hereinafter described and claimed.

In the accompanying drawings illustrating the preferred embodiment of the invention, Figure 1 is a side elevation of the device with parts broken away and parts in section to more clearly show the major parts of construction.

Figure 2 is a reduced front elevation of the device.

Figure 3 is an enlarged fragmentary vertical section of the tubular shafting and correlated parts which control the blades of the helicopter.

Figure 4 is an enlarged section on line 4—4 of Figure 3.

Figure 5 is an enlarged vertical transverse section of the gear housing for the front ground wheel of the device.

Figure 6 is an enlarged side elevation of a portion of the telescoped tubular shafting which rotates the dual propellers, with parts broken away to show interior construction.

Figure 7 is a fragmentary section on line 7—7 of Figure 6.

Figure 8 is a longitudinal, vertical cross section of the wheel driven gear unit shown in elevation in Figure 1.

Like reference characters, as used in the description and drawings, designate the same structural parts.

In the form here shown the body 10 of the device is designed for use both as a cockpit and a motor vehicle. It is formed with a nose like the front of an airplane and otherwise streamlined to reduce wind resistance. Headlights and windows are provided.

It is mounted on rubber tired ground wheels, a swiveled one 11 in front and two, 12, in the rear, provided with shock-absorbing springs interposed between the rear axle housing and the body 10.

Suitably positioned in the rear part of the body is a combustion engine 13 of conventional type to power both the rear wheels of the device and the propeller rotors. Located centrally in the body is a transmission suitably encased in an housing 14, to take off power from the drive shaft 15 of the motor. The wheel drive shaft 16, to rotate the rear axle, is adapted to mesh, by suitable gearing, with one side of the double-face bevel gear 17 which is slidably splined on the shaft 15. The gear 17 is shifted on the shaft 15 by a yoke 18, operated by lever 19 pivotally mounted, intermediate its ends, on top of the gear housing and controlled by rods 20 with the control on the instrument board in the cock-pit.

The gear case 14 is apertured in its top and mounted fast on the case, over said aperture, is a tubular column or standard 21 in perpendicular relation thereto. This standard projects through the roof of the body and is designed to support the propeller rotors and the hereinafter described gear case. It is constructed in two sections which are joined by means of a ball and socket joint 22, the two members of which are substantially hemi-spherical and hollow and member 23 somewhat more than a hemi-sphere. The upper member 23 is integral with the lower end of the upper section 24 of the standard 21 and is contained within the lower member of the ball and socket joint. This member is formed with a circumferential flange 25, which is bolted to an horizontal plate 26 adjacent the top of body 10.

The section 24, of the standard, supports a round gear case 27, which is positioned tiltably in an aperture 28 in the top of the body 10. The tilting movement is effected by tilting the section 24. This is controlled from the cock-pit by cables or links 29 attached to diametrically disposed ears on the gear case. Interiorly the case houses two horizontal bevel gears 30 and 31, suitably spaced with their gear teeth oppositely disposed to be engaged by two interposed idler bevel pinions 32.

Enclosed telescopically in the perpendicular, tubular standard is a tubular, rotor drive shaft consisting of two sections 33 and 34 which are hinged within the aforesaid ball and socket joint of the perpendicular standard by means of a universal joint including a ring 36 and ears 35 projecting from the opposing ends of the said sections and pivotally connected by bolts to said ring. These hinge connections are positioned to allow tilting of the upper section 34 longitudinally and transversely of the body 10.

The lower bevel gear 31 is keyed on the section 34 of the tubular shaft to rotate therewith while the upper bevel gear 30 is secured to the depending flange of a collar 37 which surrounds the section 34 and projects through the removable top of gear case 27. The section 34 is rotatable in said collar and the bevel gear affixed thereto. A disc plate 38 interposed between said gear and collar and fixed to both by threaded bolts, is provided with ball races for ball bearings 39 between the case cover and the upper gear 30.

Secured to the top of the collar 37 by screw bolts is the annular flange of a propeller or rotor hub 40. Interposed between this hub and the rotatable tubular shaft section 34 are suitable roller bearings 41 operating in upper and lower races in the bore of the hub, thus facilitating rotation of the said propeller hub.

Slidably mounted on the shaft section 34, above the propeller hub 40, is a collar 42 which is provided with diametrically opposed lugs 43 on which are pivotally hinged depending arms 44. These two arms incline in opposite directions on the sides of the propeller hub 40 and are pivotally connected to pairs of ears 45 projecting laterally from the diametrically disposed rotatable sleeves 46 which contain the shanks 47 of the propeller or rotor blades 48. The function of this construction is to allow the pitch of the blades to be adjusted as hereinafter explained.

Collar 42 is provided interiorly with an annular recess 49 for reception of spherical heads on a cross arm 50 which is secured to a lifting rod 51, integrally or otherwise. Rod 51 is in two sections and extends from below the lower extremity of the tubular shaft section 33 to a point above the upper extremity of section 34. The two sections of rod 51 are connected by a ball and socket joint 52 located within the ears 35 which form the universal joint connecting rotary shaft sections 33 and 34, thus allowing said rod to conform to the relative angular movement of said sections.

Secured on the upper end of said rotary shaft section 34 by screw bolts or otherwise and suitably spaced from the first mentioned propeller or rotor hub, are two diametrically opposed propeller blade sleeves 53 designed to hold the shanks of the blades 54 of a second and superimposed propeller or rotor.

An eye on the upper end of the rod 51 contains a transverse rod 55 on the ends of which are pivotally secured depending arms 56 designed to tilt the blades of this upper propeller. They are slanted in opposite directions and pivotally connected to pairs of ears 57 on studs threaded in the shanks of the blades and projecting through arcuate slots 58 in the sleeves 53, thus allowing the pitch of the blades to be adjusted synchronously with blades 48 of the underlying propeller when the rod 51 is moved vertically. Vertical movement of said rod is effected by a lever 59 positioned under the foot thereof to lift it and operated by rod leading to a control on the dash of the cock-pit. Vertical slots 60 on opposite sides of rotary shaft section 34 permit vertical movement of the cross arm 50 therein when it is desired to adjust the pitch of the blades by lifting or lowering said rod.

Secured on the lower end of the rotary shaft section 33 is a bevel pinion 61 with a central aperture for passage therethrough of the lifting rod. This pinion is positioned contiguous to the outer face of the double bevel gear 17 and is designed to mesh with same when the clutch 18 is operated to throw the two gears into engagement for the purpose of transmitting power from the engine to the propeller shaft.

A brake device is provided to hold the propellers stationary when the helicopter is converted to ground travel and this consists of a vertically movable brake shoe 62 with interior bevel face normally impinging a bevel brake drum 63 encircling the base of rotary shaft section 33. A pin 64 on the top of the brake shoe projects through the enlarged base of the column 21 and is lifted by a crank lever 65. This is operated by the clutch lever 19 when it is shifted to throw cluch 18 outward and gear 17 into engagement with bevel pinion 61.

The front ground wheel 11 of the body 10 is guided from the cock-pit by a steering wheel 66, shown in dotted lines. The steering post bears a sprocket which is connected by sprocket chain 67, also shown in dotted lines, to a sprocket 68 on a stud 69 projecting from gear housing 70 in the floor of the body 10. The inner end of stud 69 carries a bevel pinion 71 which meshes with a horizontally disposed bevel gear 72 mounted on the upper end of the strut 73 on which the traction wheel 11 is journaled, thus permitting the wheel to be turned as desired. Annular flanges, suitably spaced, hold the strut in the bottom of the gear housing but allow a swivel movement thereof.

As different embodiments may be made of this inventive concept and modifications may be made in the embodiment hereinbefore shown and described, it will be understood that the matter herein is to be interpreted as illustrative merely, and not in a limiting sense.

What I claim is:

1. A motor vehicle comprising a body, an engine mounted in said body, a transmission case carried by said engine, a tubular standard mounted at its bottom on said transmission case and extending upwardly through said body, said standard having a universal joint therein adjacent the top of said body, a tubular drive shaft extending through said standard and having a universal joint therein at the location of the universal joint in said standard, a gear within said casing secured to said drive shaft, engine-driven gear means in said casing drivingly engageable with said gear, a gear case secured on the upper end of said standard, a rotor having a hub disposed above and journaled on said gear case, reverse gearing in said gear case drivingly connecting said drive shaft to said rotor, a second rotor secured to said drive shaft above said first-mentioned rotor, manually-operated means operatively connected to said gear case to controllably tilt said rotors, and manually-operated means, including a universally jointed rod extending through said tubular drive shaft, operative to change the blade pitch of said rotors.

2. A motor vehicle comprising a body, ground wheels supporting said body including a steering wheel and driving wheels, an engine mounted in said body, a transmission connected to said engine and including a transmission case, a wheel drive shaft extending from said driving wheels to said transmission case, a tubular standard mounted at its bottom on said case and extending upwardly through and above said body, said standard having a universal joint therein at the top of said body, a tubular, rotor drive shaft extending through said standard and having a universal joint therein at the location of the universal joint in said standard, a gear in said casing secured to the lower end of said rotor drive shaft, engine-driven gear means in said casing drivingly connectible alternatively with said wheel-driving shaft or said rotor drive-shaft, a gear case secured on the upper end of said standard, a rotor having a hub above and rotatably supported on said gear case, reverse gearing in said gear case drivingly connecting said drive shaft to said rotor, a second rotor secured to said drive shaft above said first-mentioned rotor, manually-operated means operatively connected to said gear case to controllably tilt said rotors, and manually-operated means extending through said drive shaft operative to change the blade pitch of said rotors.

3. In combination, a motor vehicle having a body, a driving engine, a transmission drivenly connected to said engine and including a transmission case, drive wheels, and a wheel drive shaft drivingly connected to said drive wheels, a sectional tubular standard based on said transmission case and extending vertically therefrom intermediate the front and rear ends of said body, a universal joint in said standard adjacent the top of said body, a sectional, tubular, rotor drive shaft in said standard, a universal joint in said shaft at the location of the universal joint in said standard, reversing gear mechanism, carried by said standard above said universal joint and driven by said rotor drive shaft, a first rotor mounted on said shaft and driven thereby, a second rotor mounted on said standard and driven by said reversing gear mechanism in a direction opposite the direction of rotation of said first rotor, manually operated means in said body connected to said standard above said universal joint for tilting the upper portions of said standard and said rotor drive shaft to various angular inclinations relative to the portion of said standard below said universal joints, a sectional rod extending through said rotor drive shaft, a ball and socket joint in said rod at the location of said universal joints, means connecting the blades of said rotors to the upper end of said rod for varying the pitch of the rotor blades while permitting free rotation of the rotors in opposite directions, manually operated means in said body connected to said rod at the lower end of the latter to impart longitudinal movement to said rod, said transmission providing a driving connection between said engine and said tubular rotor drive shaft for power operative rotation of said rotors, and manually operative means connected to said transmission to alternatively connect said engine to said rotor drive shaft or to said wheel drive shaft.

4. In combination, a motor vehicle having a body, a driving engine, a transmission drivenly connected to said engine and including a transmission case, drive wheels, and a wheel drive shaft drivingly connected to said drive wheels, a sectional tubular standard based on said transmission case and extending vertically therefrom intermediate the front and rear ends of said body, a universal joint in said standard adjacent the top of said body, a sectional, tubular, rotor drive shaft in said standard, a universal joint in said shaft at the location of the universal joint in said standard, reversing gear mechanism, carried by said standard above said universal joint and driven by said rotor drive shaft, a first rotor mounted on said shaft and driven thereby, a second rotor mounted on said standard and driven by said reversing gear mechanism in a direction opposite the direction of rotation of said first rotor, manually operated means in said body connected to said standard above said universal joint for tilting the upper portions of said standard and said rotor drive shaft to various angular inclinations relative to the portion of said standard below said universal joints, a sectional rod extending through said rotor drive shaft, a ball and socket joint in said rod at the location of said universal joints, means connecting the blades of said rotors to the upper end of said rod for varying the pitch of the rotor blades while permitting free rotation of the rotors in opposite directions, manually operated means in said body connected to said rod at the lower end of the latter to impart longitudinal movement to said rod, said transmission providing a driving connection between said engine and said tubular rotor drive shaft for power operative rotation of said rotors, manually operative means connected to said transmission to alternately connect said engine to said rotor drive shaft or to said wheel drive shaft, and braking means in said transmission operative to hold said rotor drive shaft against rotation when said engine is drivingly connected to said wheel drive shaft.

THOMAS H. JUDGE.

REFERENCES CITED

The following references are of record in the file of this patent:

UNITED STATES PATENTS

| Number | Name | Date |
|---|---|---|
| 955,049 | Brekke | Apr. 12, 1910 |
| 2,135,073 | Gerhardt et al. | Nov. 1, 1938 |
| 2,404,014 | Thornes | July 16, 1946 |

FOREIGN PATENTS

| Number | Country | Date |
|---|---|---|
| 826,798 | France | Jan. 12, 1938 |